United States Patent
Wellbrock et al.

(10) Patent No.: US 9,680,564 B2
(45) Date of Patent: Jun. 13, 2017

(54) PROTECTION IN METRO OPTICAL NETWORKS

(71) Applicant: Verizon Patent and Licensing Inc., Basking Ridge, NJ (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 77 days.

(21) Appl. No.: 13/975,968

(22) Filed: Aug. 26, 2013

(65) Prior Publication Data
US 2015/0055945 A1 Feb. 26, 2015

(51) Int. Cl.
| | |
|---|---|
| H04B 10/032 | (2013.01) |
| H04J 14/02 | (2006.01) |
| H04L 12/24 | (2006.01) |
| H04L 12/707 | (2013.01) |
| H04L 12/703 | (2013.01) |

(52) U.S. Cl.
CPC .......... *H04B 10/032* (2013.01); *H04J 14/021* (2013.01); *H04J 14/0291* (2013.01); *H04J 14/0294* (2013.01); *H04J 14/0297* (2013.01); *H04L 41/0668* (2013.01); *H04L 41/0681* (2013.01); *H04L 45/22* (2013.01); *H04L 45/28* (2013.01)

(58) Field of Classification Search
CPC ............... H04B 10/032; H04J 14/0294; H04L 41/0668; H04L 45/22; H04L 41/0681
See application file for complete search history.

(56) References Cited

U.S. PATENT DOCUMENTS

| | | | |
|---|---|---|---|
| 6,222,653 B1* | 4/2001 | Asahi | 398/4 |
| 6,567,194 B1* | 5/2003 | Badr | 398/1 |
| 2002/0172148 A1 | 11/2002 | Kim et al. | |
| 2005/0025489 A1* | 2/2005 | Aldridge | H04B 10/2503 398/83 |
| 2008/0074732 A1* | 3/2008 | Stephens | H04B 10/2933 359/334 |
| 2013/0004163 A1* | 1/2013 | Aoki | H04B 10/506 398/34 |
| 2013/0011136 A1* | 1/2013 | Hao | H04Q 11/00 398/45 |
| 2013/0216216 A1 | 8/2013 | Bottari et al. | |
| 2013/0272693 A1* | 10/2013 | Zhang et al. | 398/5 |

* cited by examiner

*Primary Examiner* — Ken N Vanderpuye
*Assistant Examiner* — Mina Shalaby

(57) ABSTRACT

An optical network is configured to optimize network resources. The optical network includes multiple optical nodes, light paths between the multiple optical nodes, and a network monitoring device. The network monitoring device monitors the optical network to identify a failure in the optical network. When the failure is a fiber failure, light paths are re-routed around the fiber failure while maintaining the required bandwidth for the optical network. When the failure is a transponder card failure within one of the multiple nodes, a floating spare card may be provisioned to service a particular light path associated with the transponder card failure. When the failure is a node failure, transponder cards in some of the multiple optical nodes are provisioned to reconfigure some of the plurality of light paths to route traffic around the failed node.

20 Claims, 8 Drawing Sheets

PROTECTION IN METRO OPTICAL NETWORKS

BACKGROUND

Routing video, data, and voice traffic at high bit rates via Ultra Long Haul (ULH) or metro optical networks is substantially increasing in modern communications systems. Some variants of such systems transmit optical signals through optical fibers via dense wavelength division multiplexing (DWDM), in which multiple wavelengths of light are transmitted simultaneously through a single fiber. DWDM systems typically employ devices called reconfigurable optical add/drop multiplexers (ROADMs) to add and remove signals from the network in a purely optical manner, without requiring conversion to/from the electrical domain.

In a typical metro optical network architecture, traffic protection against various network failures is provided by doubling the network capacity over the projected traffic (also referred to as 1+1 protection architecture). Thus, the typical architecture offers an inefficient use of resources and limits network growth.

DETAILED DESCRIPTION OF PREFERRED EMBODIMENTS

The following detailed description refers to the accompanying drawings. The same reference numbers in different drawings may identify the same or similar elements.

Systems and methods described herein may provide an optical network configured to optimize network resources. The optical network may include multiple optical nodes, light paths between the multiple optical nodes, and a network monitoring device. The network monitoring device may monitor the optical network to identify a failure in the optical network. When the failure is a fiber failure, light paths may be re-routed around the fiber failure while maintaining the required bandwidth for the optical network. When the failure is a transponder card failure within one of the multiple nodes, a floating spare card may be provisioned to service a particular light path associated with the transponder card failure. When the failure is a node failure, transponder cards in some of the multiple optical nodes may be provisioned to reconfigure some of the plurality of light paths to route traffic around the failed node. The systems and method described herein may be used to reduce idle capacity required in typical protection schemes and reduce capital expenditures for hardware such as gray optics and transponder cards.

Figure 1:
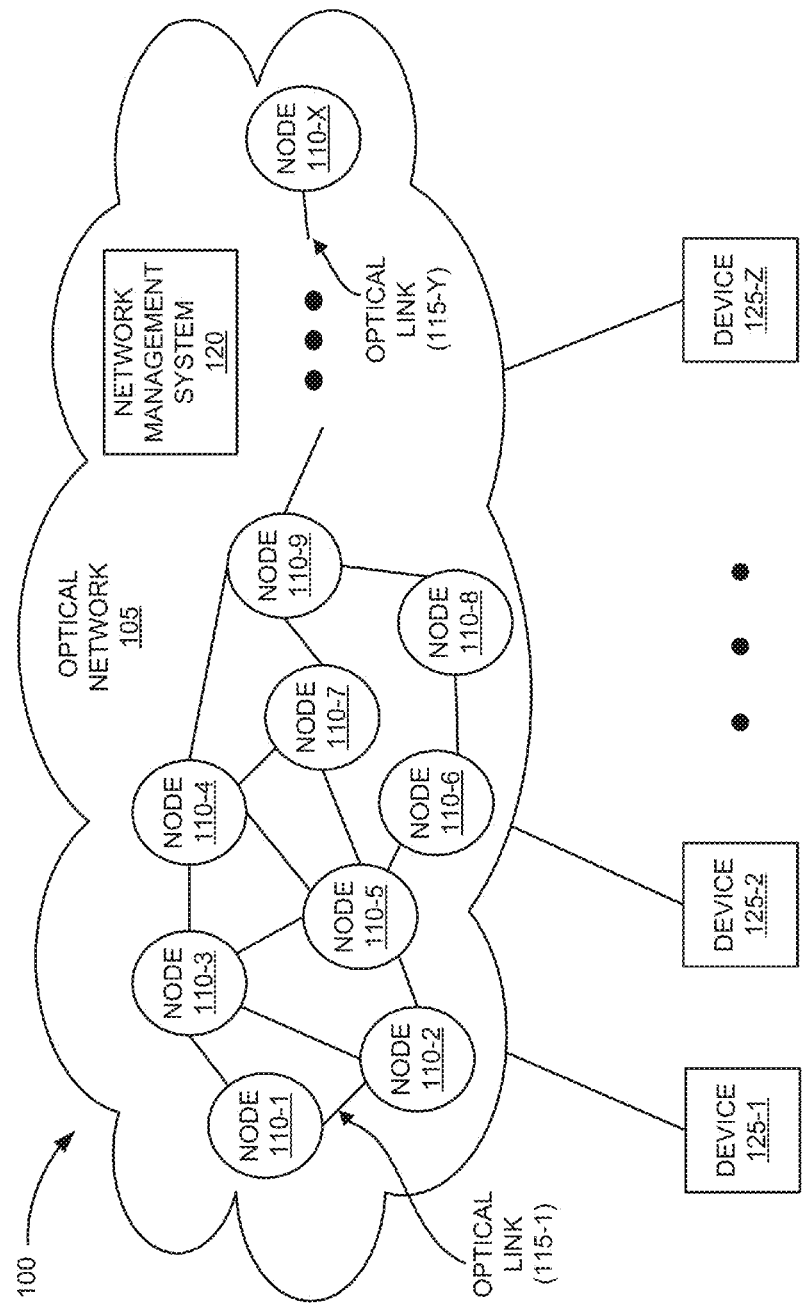
FIG. 1 is a diagram illustrating an exemplary environment in which systems and methods described herein may be implemented.

FIG. 1 is a diagram illustrating an exemplary environment of an optical network in which systems and methods described herein may be implemented. As illustrated in FIG. 1, an exemplary environment 100 includes an optical network 105 including optical node 110-1 through optical node 110-X, in which X>1 (referred to individually as "optical node 110" or collectively as optical nodes 110), optical link 115-1 through optical link 115-Y, in which Y>1 (referred to individually as optical link 115 or collectively as optical links 115), and network management system 120. Environment 100 also includes device 125-1 through device 125-Z, in which Z>1 (referred to individually as device 125 or collectively as devices 125). Devices 125 may be communicatively coupled to optical network 105 via various access technologies.

The number of devices (which includes optical nodes) and the configuration in environment 100 are exemplary and provided for simplicity. According to other embodiments, environment 100 may include additional devices, fewer devices, different devices, and/or differently-arranged devices than those illustrated in FIG. 1. For example, environment 100 may include intermediary devices (not illustrated) to permit communication between devices 125 and optical network 105.

Optical network 105 may include, for example, a synchronous optical network or other types of optical networks. Optical network 105 may be implemented using various topologies (e.g., mesh, ring, etc.). According to an exemplary embodiment, optical network 105 is a long-haul optical network (e.g., long-haul, extended long-haul, ultra long-haul). In one implementation, optical network 105 may be implemented as an agile photonic network that uses flexible end-to-end channel allocation. According to aspects described herein, an agile photonic network may be configured to reduce capital costs over conventional optical networks. Generally, optical network 105 may enable activation of wavelengths from an optical node 110 to any other optical node 110 and may automatically provision light paths to route around points of failure.

Optical node 110 is a point in optical network 105. For example, optical node 110 may be an aggregation node (e.g., that does not communicate directly with other aggregation nodes) or a core node (e.g., that passes communications from/to aggregation nodes). Optical node 110 may be implemented as a DWDM system. Optical link 115 is an optical fiber (e.g., nonzero dispersion-shifted fiber, etc.) that communicatively couples one optical node 110 to another optical node 110.

Network management system 120 may manage the configuration of optical network 105 including the optical nodes 110. Network management system 120 may permit administrators to monitor, configure, etc., optical network 105. Network management system 120 may be capable of identifying network state information, resource availability, resource allocation, and/or other parameters pertaining to optical network 105. Network management system 120 may communicate with a network management module (e.g., network management module 240 in FIG. 2) of an optical node 110 regarding these parameters as such parameters relate to the features described herein. For example, network management system 120 may monitor optical network 105 for failures and direct corrective action to avoid communication disruptions. In one aspect, as described further herein, network management system 120 may initiate or suggest re-routing of light paths around a failed node or fiber failure. In another aspect, as also described further herein, network management system 120 may initiate or suggest provisioning a spare transponder card to replace a failed card and/or interface. Network management system 120 may include one or more network devices (e.g., a server, a computer, etc.) including various memories and/or processors. Network management system 120 may be implemented in a centralized or a distributed fashion.

Device 125 may include a device having the capability to communicate with a network (e.g., optical network 105), devices and/or systems. For example, device 125 may correspond to a user device, such as a portable device, a handheld device, a mobile device, a stationary device, a vehicle-based device, or some other type of user device. Additionally, or alternatively, device 125 may correspond to a non-user device, such as, a meter, a sensor, or some other device that is capable of machine-to-machine (M2M) communication.

Figure 2:
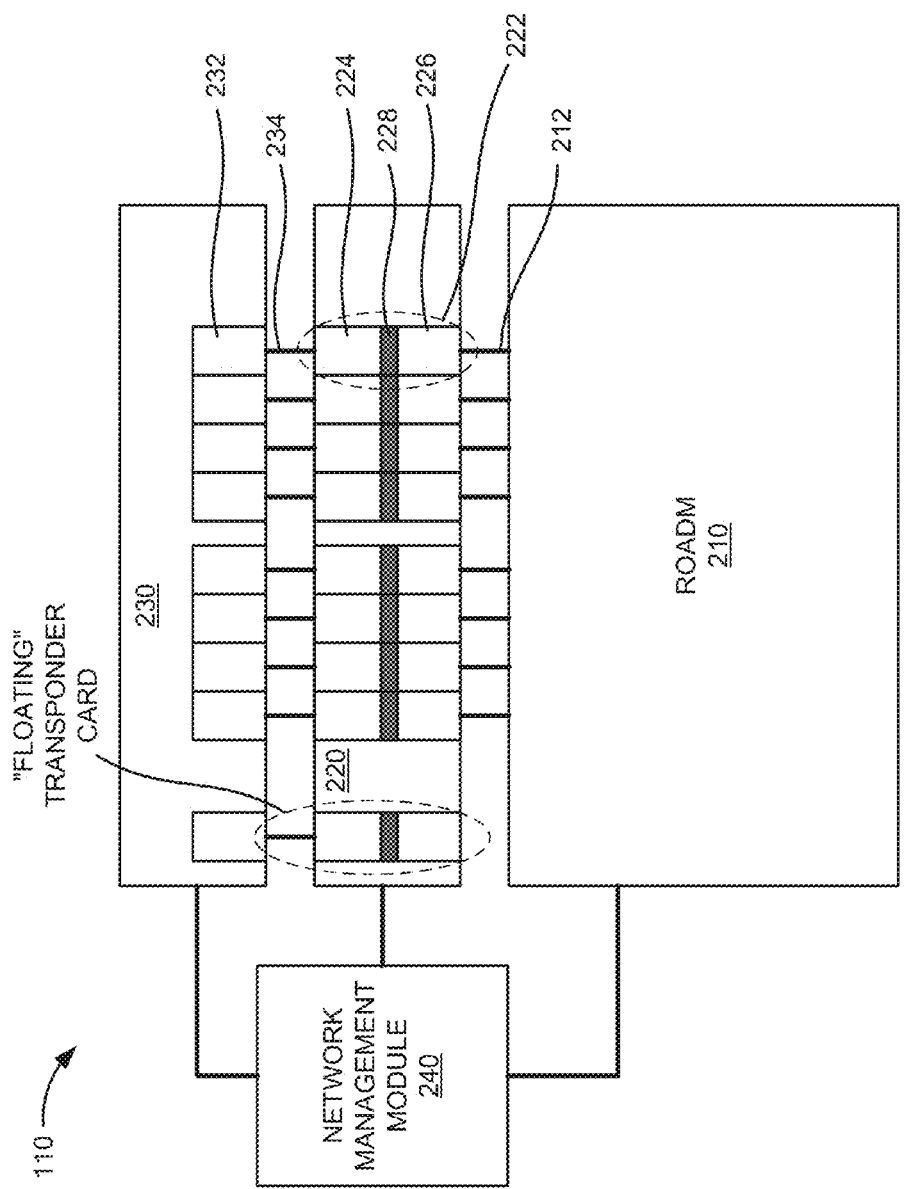
FIG. 2 is a diagram illustrating an exemplary embodiment of an optical node of FIG. 1.

FIG. 2 is a diagram illustrating components of an exemplary embodiment of optical node 110 depicted in FIG. 1. As shown in FIG. 2, optical node 110 may include a reconfigurable optical add/drop multiplexer (ROADM) 210, a transponder chassis 220, a data switch 230, and a network management module 240.

ROADM 210 can remotely switch traffic that was transmitted using WDM or DWDM at the wavelength layer. According to one implementation, ROADM 210 may include a colorless (e.g., any wavelength to any add/drop port), a directionless (e.g., any wavelength to any degree), a contentionless (e.g., any combination of wavelengths to any degree from any port), and a gridless (e.g. no fixed frequency) architecture. ROADM 210 may support any portion of the optical spectrum provided by optical network 105, any channel bit rate, and/or any modulation format. ROADM 210 may employ agile photonic connections 212 that enable changes in trunk connectivity from one transponder card to a floating transponder card without physically re-connecting the floating transponder card to a new port. ROADM 210 is described further in connection with FIG. 3.

Figure 3:
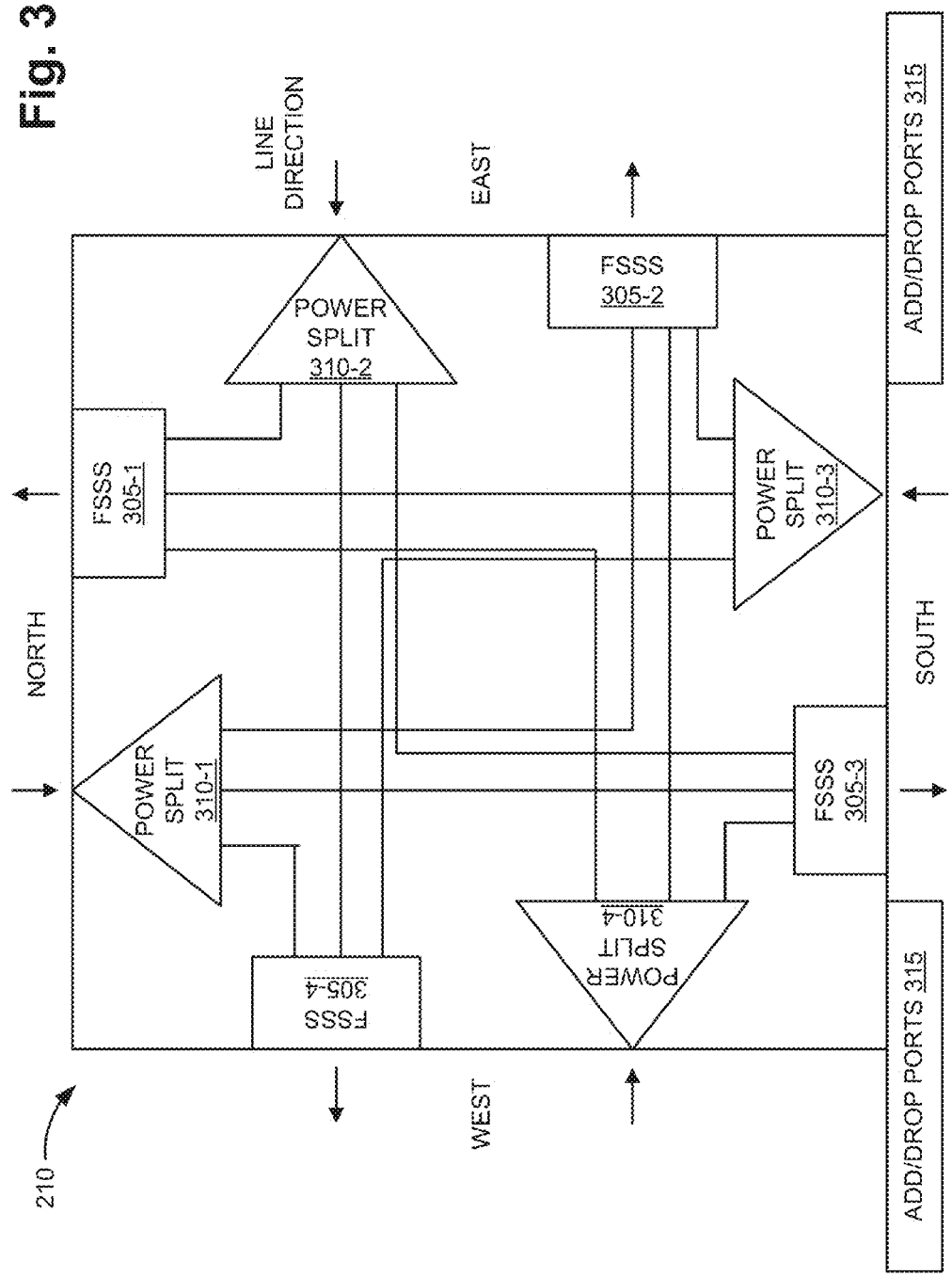
FIG. 3 is a diagram illustrating an exemplary embodiment of an add-drop multiplexer that may be included in the optical node of FIG. 2.

FIG. 3 is a diagram illustrating an exemplary embodiment of ROADM 210 that may be included in one or more of optical nodes 110. As illustrated, ROADM 210 may include, among other components, flexible spectrum selective switches (FSSSs) 305-1 through 305-4 (referred to individually as FSSS 305 or collectively as FSSSs 305), power splitters 310-1 through 310-4 (referred to individually as power splitter 310 or power splitters 310), and add/drop ports 315. According to other embodiments, ROADM 210 may have a different degree (i.e., other than a 4-degree ROADM).

The number of components and the configuration (e.g., connection between components) show in FIG. 3 are exemplary and provided for simplicity. According to other embodiments, ROADM 210 may include additional components, fewer components, different components, and/or differently-arranged components than those illustrated in FIG. 3. For example, ROADM 210 may include a channel monitor and/or an error detector. According to an exemplary implementation, ROADM 210 may take the form of a ROADM blade. According to an exemplary embodiment, ROADM 210 is colorless, directionless, contentionless, and gridless.

FSSS 305 may include a spectrum selective switch that, among other things, may be able to switch any optical channel regardless of its bandwidth and central frequency.

FSSS 305 may also have grid-free capability. FSSS 305 may also accommodate other features pertaining to the optical network described herein. In this regard, FSSS 305 may be distinguishable from a Wavelength Selective Switch (WSS) that is used in a conventional ROADM. Power splitter 310 may include an optical power splitter and/or an optical power combiner that is/are color-agnostic, directionless, and contentionless. Power splitter 310 may provide for splitting and/or combining of optical signals in optical fibers. Add/drop ports 315 are ports for adding and dropping optical signals.

ROADM 210 (e.g., FSSS 305) is capable of using the available spectral bandwidth in a colorless, directionless, contentionless, and gridless framework. Additionally, as previously described, ROADM 210 may switch wavelengths flexibly among transponder cards. In other aspects, the total number of optical channels in the transport system is not fixed, the data rate of each optical channel is not fixed, the number of optical carriers for each optical channel is not fixed, the central frequency of an optical channel is not adherent to a fixed frequency grid, and the bandwidth and the number of optical carriers of each optical channel may be dynamically adjusted based on network traffic demands, available resources, etc.

Returning to FIG. 2, transponder chassis 220 generally includes equipment to convert signal formats between client signals (to/from data switch 230) and trunk signals (from/to ROADM 210). Client-facing "gray" optical signals generally operate at shorter wavelengths, whereas trunk signals include DWDM "colored" optical signals in a longer wavelength range. Transponder chassis 220 may include multiple transponder cards 222. Each transponder card 222 may be configured to convert gray optical client interface signals (e.g., from switch 230) into trunk signals that operate in the colored DWDM wavelengths used by ROADM 210. Conversely, transponder card 222 may also convert signals in the "colored" DWDM wavelengths from ROADM 210 to "gray" optical client interface signals that may be used by switch 230. Each transponder card 222 may include, for example, a gray optics module 224 and a line optical module 226 coupled by a processor 228 that converts signals for gray optics module 224 and line optical module 226. For example, processor 228 may include logic to convert optical signals from line optical module 224 to construct frames, packets, or other type of data containers for gray optics module 224.

In one implementation, transponder card 222 may include a 100-Gbps (gigabytes per second) multirate transponder card. Thus, in this implementation, transponder card 222 may processes a 100-Gbps signal on the client side into one 100-Gbps DWDM signal on the trunk side. According to implementations described herein, transponder chassis may be configured with multiple transponder cards that can be provisioned (e.g., tuned for a particular wavelength) without the presence of on-site personnel.

Data switch 230 may include a data transfer device, such as a router, a switch (e.g., multiprotocol label switching (MPLS) switch), a gateway, a device providing domestic switching capabilities, or some other type of device that processes and/or transfers data. In one implementation, data switch 230 may operate on data on behalf of a network providing data to/from client devices 125 and may serve as an entrance to optical network 105. In one implementation, data switch 230 may include multiple gray optics modules 232, each of which may communicate with one of transponder cards 222 via a switch-transponder interface 234.

Network management module 240 may include one or multiple processors, microprocessors, multi-core processors, application specific integrated circuits (ASICs), controllers, microcontrollers, and/or some other type of hardware logic to perform the processes or functions described herein. Network management module 240 may configure the operation of optical node 110 based on information received from network management system 120 and/or optical network requirements (e.g., network traffic demands, resources available, interruptions/failures, etc.). For example, network management module 240 may identify a network failure, tune (or direct tuning of) a spare transponder card 222 within node 110, and/or re-arrange a light path between nodes 110 to prevent traffic disruptions. Network management module 240 may also correlate performance and alarm information across all optical carriers. Network management module 240 may include one or multiple processors, microprocessors, multi-core processors, application specific integrated circuits (ASICs), controllers, microcontrollers, and/or some other type of hardware logic to perform the processes or functions described herein.

Generally, a transmitting-side of optical node 110 may output optical signals to optical links 115, which may traverse light paths in optical network 105. A receiving-side of optical nodes 110 may be configured both in terms of operation and available node resources for full bandwidth utilization.

According to implementations described herein, one or more transponder cards 222 may be used as a "floating" transponder card, such that the wavelength of the floating transponder card 222 can be tuned to replace any one of the other transponder cards 222. Upon network management module 240 detecting a failure of one of transponder cards 222, the floating transponder card 222 may be automatically configured to replace the failed transponder card 222 within transponder chassis 230. The application of a single floating transponder card (or any amount of floating transponder cards less than the total amount of active cards) in optical nodes 110 can significantly reduce idle capacity in optical network 105. For example, the number of unused and/or under-utilized gray optics modules 224/232 and line optical modules 226 may be reduced to as few as a single spare in each optical node 110, while the remaining active components may operate at or near one hundred percent capacity, when required.

For a single node with individual card failures, one floating transponder card 222 can generally provide sufficient protection to achieve required reliability metrics (e.g., 99.99%). If there is a probability of multiple card failures in a single optical node 110, more than one floating transponder card 222 may be used. However, the probability of multiple simultaneous card failures in most optical node applications would be so small as to not affect reliability calculations. If the total number of floating transponder cards 222 and active transponder cards 222 are not enough to support all working connections during an event where an entire core node is disabled, additional floating transponder cards may be implemented in the core nodes of a particular optical network while a single floating transponder card may provide adequate protection for aggregation nodes.

The number of components and the configuration (e.g., connection between components) shown in FIG. 2 are exemplary and provided for simplicity. According to other embodiments, optical node 110 may include additional components, fewer components, different components, and/or differently-arranged components than those illustrated in FIG. 2. For example, optical node 110 may include a laser, a power source, an optical amplifier (e.g., Erbium Doped Fiber Amplifier (EDFA), Raman amplifier, etc.), digital signal processing (DSP) (e.g., forward error correction (FEC), equalization, filtering, etc), etc.

Figure 4:
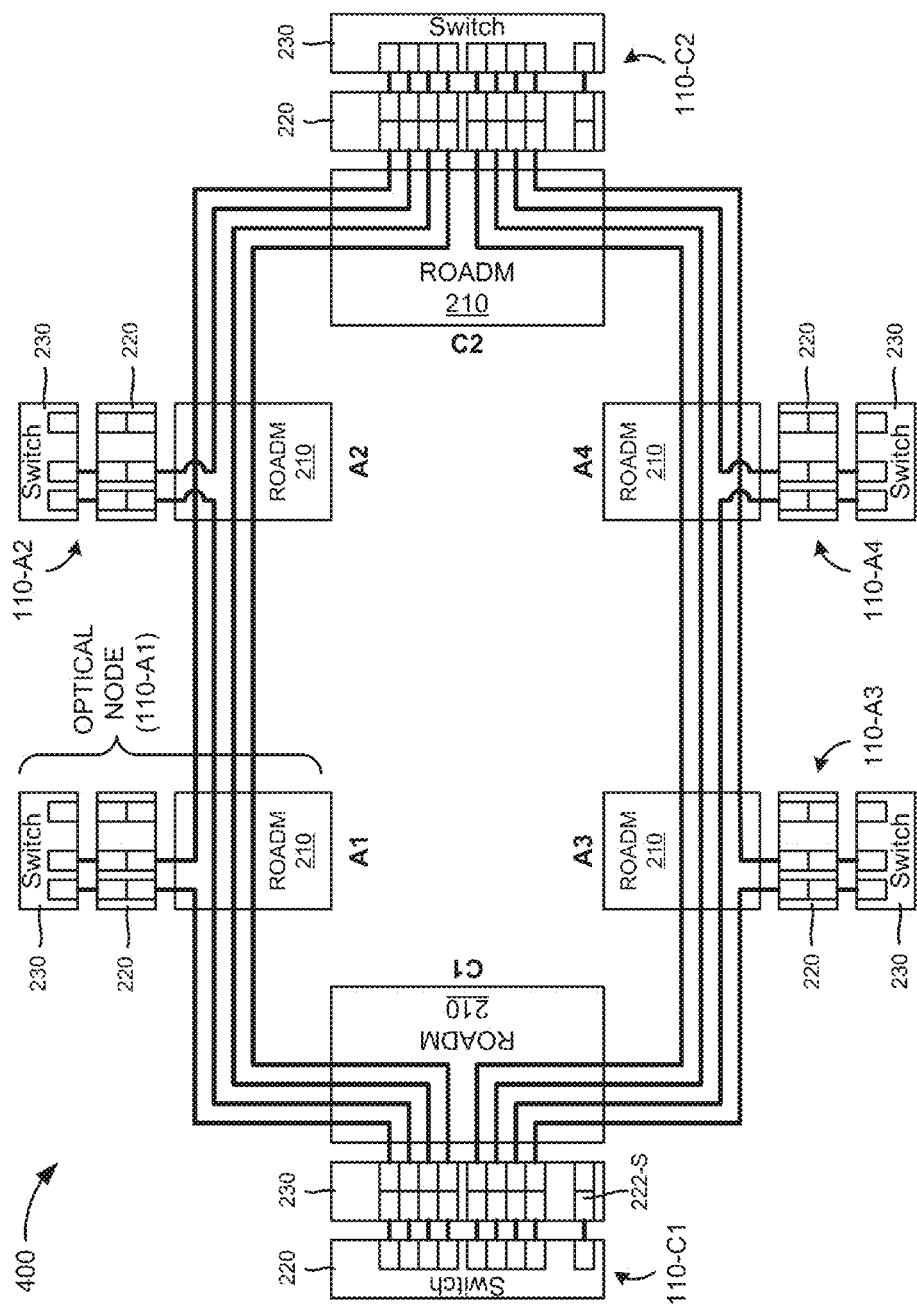
FIG. 4 is a schematic diagram of an exemplary portion of the optical network of FIG. 1.

FIG. 4 provides a simplified schematic of a portion 400 of optical network 105 configured according to an implementation described herein. As shown in FIG. 4, network portion 400 may include a ring topology with six optical nodes 110, two of which are core nodes (e.g., 110-C1 and 110-C2) and four of which are aggregation nodes (e.g., 110-A1, 110-A2, 110-A3, and 110-A4). Each optical node (e.g., 110-C1, 110-C2, 110-A1, 110-A2, 110-A3, and 110-A4) may include a ROADM 210, a transponder chassis 220, a data switch 230, and a network management module 240 (not shown in FIG. 4), as described above in connection with FIG. 2.

In the configuration of FIG. 4, traffic does not flow directly between aggregation nodes (e.g., directly from nodes 110-A1 to 110-A2, etc.). Thus, traffic patterns in network portion 400 may include links between core nodes 110-C1 and 110-C2 and links between core nodes 110-C1/110-C2 and any of aggregation nodes 110-A1 through 110-A4. Assume network portion 400 is configured to meet an initial traffic demand of 1200 Gbps. Particularly, the initial traffic demand between nodes 110-C1, 110-C2, 110-A1, 110-A2, 110-A3, and 110-A4 may be defined as shown in Table 1.

TABLE 1

Initial Traffic Demand between Nodes (Gbps)

| NODE | C1 | C2 | A1 | A2 | A3 | A4 |
|------|----|----|----|----|----|----|
| C1   | —  | 400 | 100 | 100 | 100 | 100 |
| C2   | —  | —  | 100 | 100 | 100 | 100 |
| A1   | —  | —  | —  | 0  | 0  | 0  |
| A2   | —  | —  | —  | —  | 0  | 0  |
| A3   | —  | —  | —  | —  | —  | 0  |
| A4   | —  | —  | —  | —  | —  | —  |

To support the required traffic demand, according to one embodiment, each core node (e.g., 110-C1 and 110-C2) may include nine 100 Gbps card sets. Eight card sets may be provisioned to support the traffic demand for the core node (e.g., 800 Gbps total) and one card set may be installed as a floating transponder card set (e.g., 100 Gbps). Additionally, each aggregation node (e.g., 110-A1 through 110-A4) may include three card sets of 100 Gbps line cards and 100 Gbps gray optics modules. Two card sets may be provisioned to support the traffic demand for the aggregation node (e.g., 200 Gbps total) and one card set may be installed as a floating transponder card set (e.g., 100 Gbps). Particularly, each card set would include a line optical module 226 and a gray optics module 224 paired to a gray optics module 232.

Generally, according to implementations described herein, network portion 400 may be configured to provide a required bandwidth with no additional wavelength reservation for protection (e.g., full bandwidth utilization). Each of the optical nodes 110 may include card sets (e.g., line optical module 226 and a gray optics module 224 paired to a gray optics module 232) with a majority (e.g., two or more) of the card sets provisioned as active cards to receive a traffic load of up to full capacity of the card sets and a minority (e.g., as few as one) of the card sets provisioned as floating spare cards for the active cards.

In the configuration of FIG. 4, network portion 400 may support an overall traffic capacity of 1200 Gbps, with reliable backup capacity, while using significantly less dedicated hardware than a typical 1+1 protection architecture. Particularly, the configuration of network portion 400 may use a total of thirty 100 Gbps card sets (e.g., twenty-four active card sets with six floating backup card sets) distributed among nodes 110-C1, 110-C2, 110-A1, 110-A2, 110-A3, and 110-A4 (with each card set including a line optical module 226, a gray optics module 224, and a gray optics module 232). By contrast, a typical 1+1 protection architecture for the same capacity and traffic pattern would require a total of forty-eight 100 Gbps card sets (e.g., twenty-four active card sets with twenty-four fixed backup card sets) distributed among nodes 110-C1, 110-C2, 110-A1, 110-A2, 110-A3, and 110-A4.

Protection of network portion 400 may include protection from card failures within nodes, fiber failures between nodes, and node failures. Individual card failures within an optical node 110 (e.g. failure of a line optical module 226, a gray optics module 224, or a gray optics module 232) may prevent communications between two particular nodes 110. Fiber failures (e.g., a fiber cut) may disrupt communications between multiple nodes 110. Node failures may disrupt communications to the failed node 110 and light paths that pass through the failed node 110. Network management system 120 and/or the network management modules 240 in each node 110 may monitor network portion 400 for failures/alarms due to card failures within nodes, fiber failures between nodes, and node failures. For example, network management modules 240 may detect a local failure or series of transmission time-outs for an individual card set or multiple card sets. Additionally, or alternatively, network management system 120 may receive input from multiple network management modules 240 to determine a mode of failure, such as failed communications along multiple light paths that are indicative of a fiber failure or multiple card failures at a single optical node 110 that are indicative of a node failure.

Network management system 120 and/or the network management modules 240 may initiate reconfiguration of light paths and/or card sets to avoid traffic disruptions until, for example, additional network repairs (e.g., by a service technician) can be provided to restore failed components.

Although FIG. 4 show exemplary components of network portion 400, in other implementations, network portion 400 may include fewer components, different components, differently-arranged components, and/or additional components than depicted in FIG. 4. Alternatively, or additionally, one or more components of network portion 400 may perform one or more other tasks described as being performed by one or more other components of network portion 400.

Figure 5:
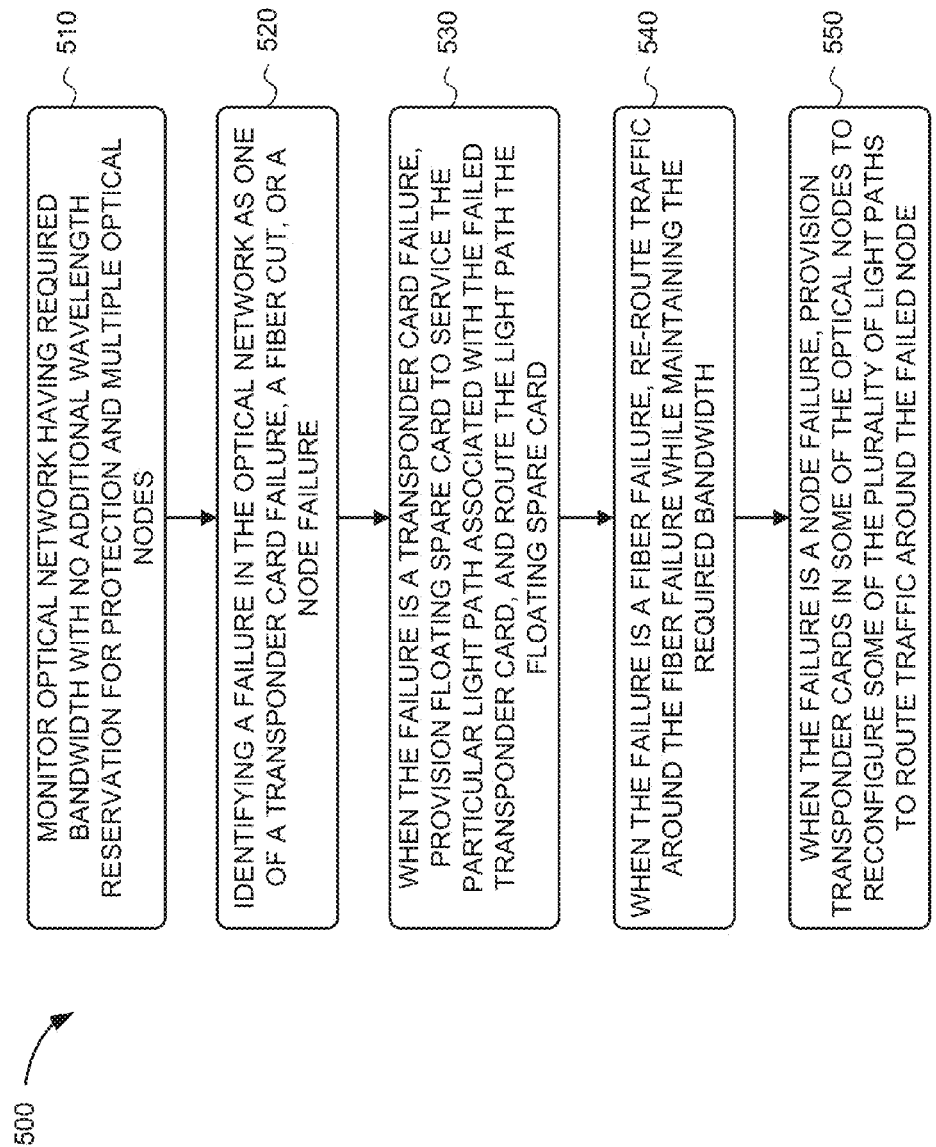
FIG. 5 is a flow diagram illustrating an exemplary process to manage an optical network.

FIG. 5 is a flow diagram illustrating an exemplary process 500 to manage an optical network according to an implementation described herein. According to an exemplary embodiment, process 500 may be performed by network management system 120. According to another embodiment, the exemplary processes may be performed by a combination of network management system 120 and network management module 240. According to yet another exemplary embodiment, the exemplary processes may be performed by network management module 240.

Figure 6A:
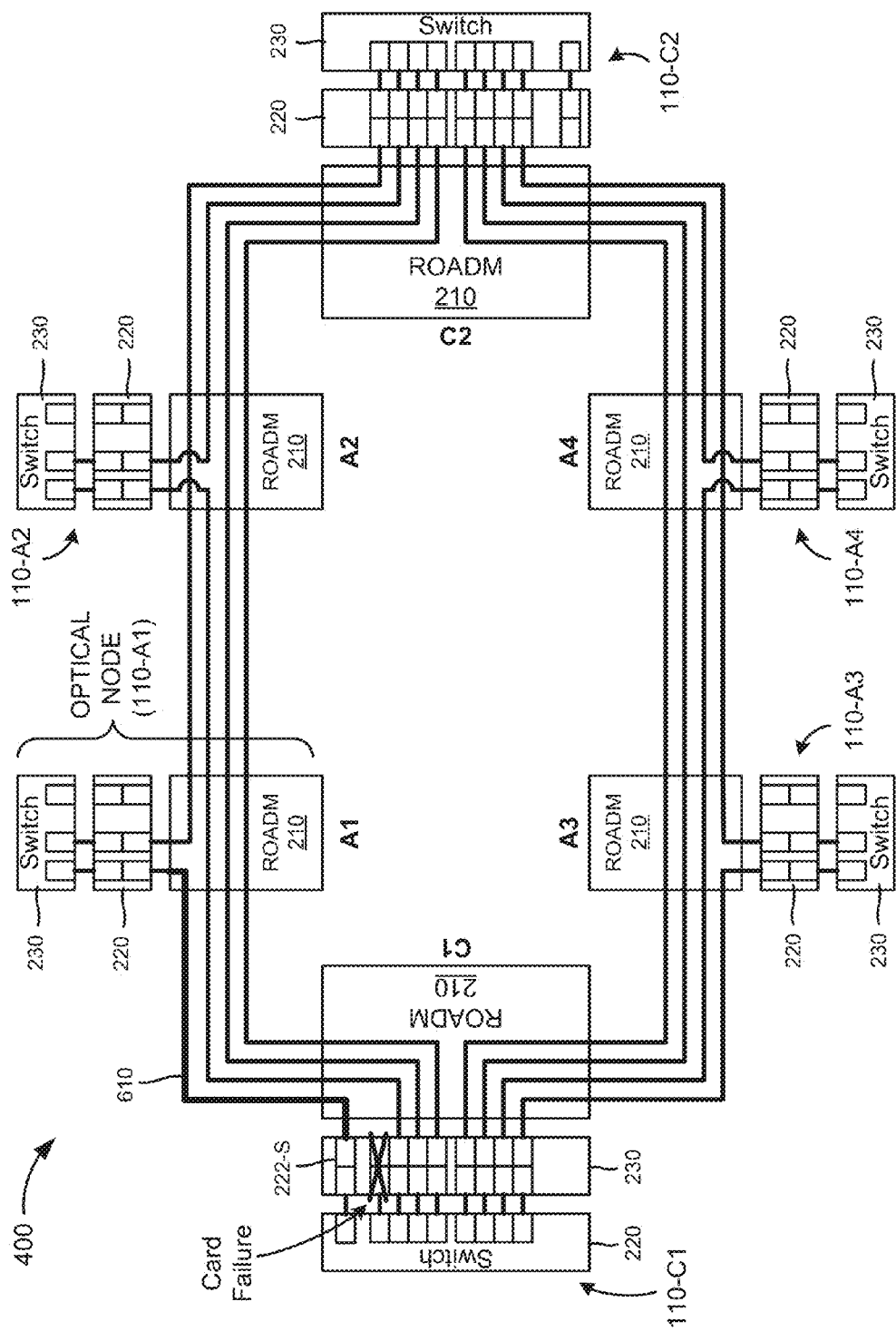
FIG. 6A is a schematic diagram of a card failure protection scheme in the portion of the optical network of FIG. 4.
Figure 6B:
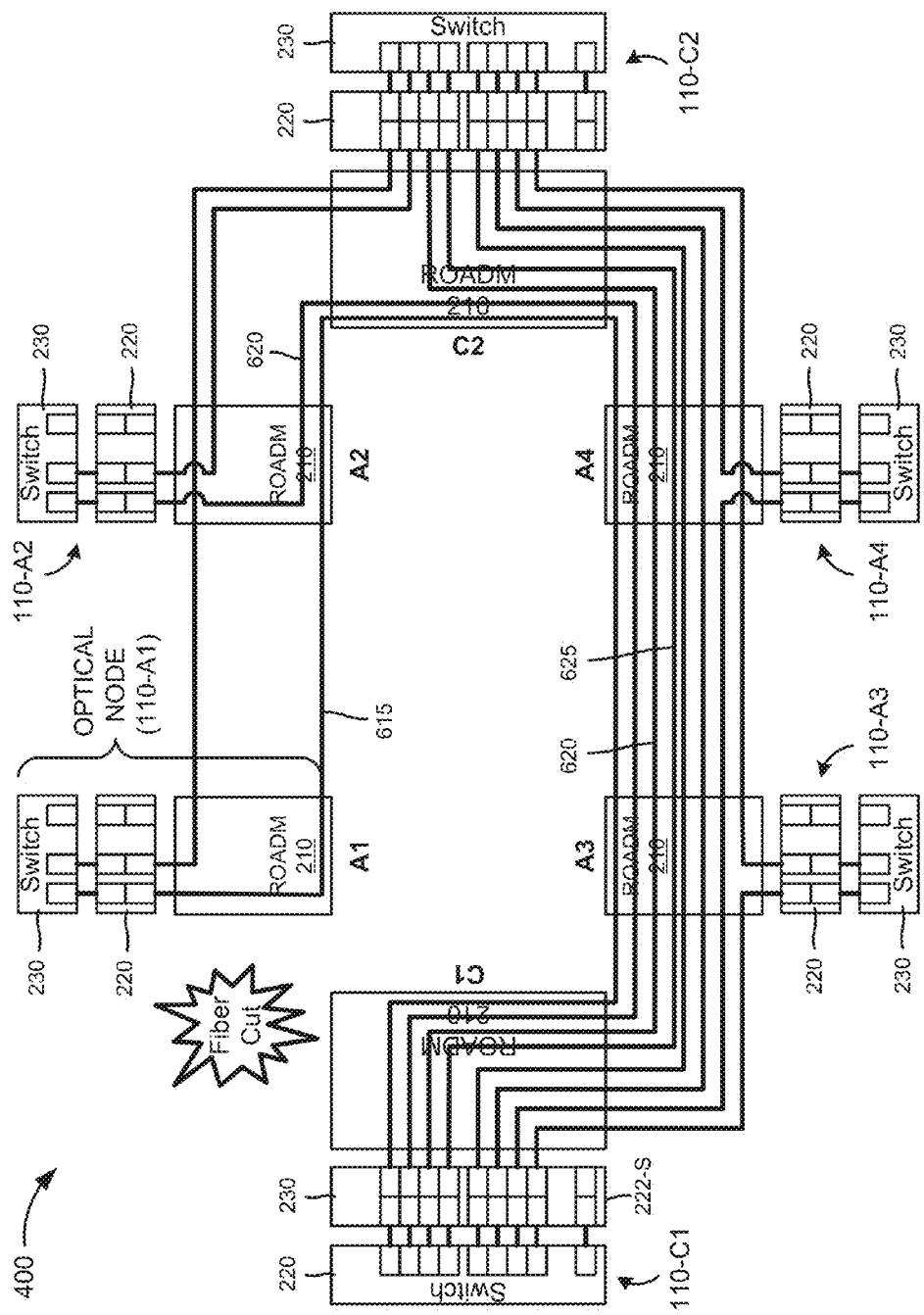
FIG. 6B is a schematic diagram of a fiber failure protection scheme in the portion of the optical network of FIG. 4.
Figure 6C:
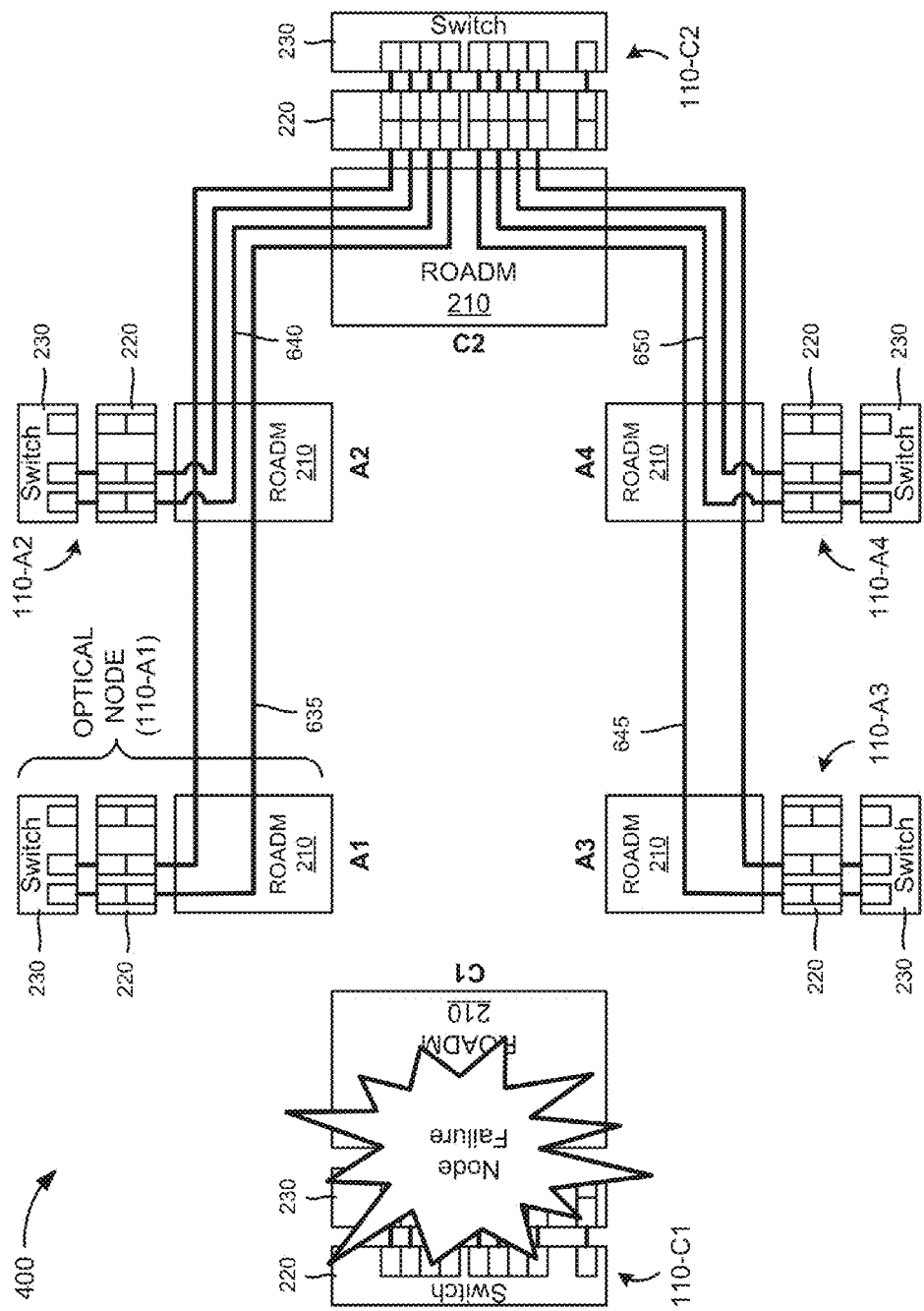
FIG. 6C is a schematic diagram of a node failure protection scheme in the portion of the optical network of FIG. 4.

Parts of process 500 are described below in connection with FIGS. 4 and 6A-6C. FIG. 6A is a schematic diagram of a card failure protection scheme in network portion 400. FIG. 6B is a schematic diagram of a fiber failure protection scheme in network portion 400. FIG. 6C is a schematic diagram of a node failure protection scheme in t network portion 400.

As shown in FIG. 5, process 500 may include monitoring an optical network having a required bandwidth with no additional wavelength reservation for protection and multiple optical nodes (block 510). For example, as shown in FIG. 4, network portion 400 may include multiple core nodes 110 and aggregation nodes 110 connected by light paths with no additional wavelength reservation. Each node may include transponder cards with a majority of the transponder cards provisioned as active cards to receive a traffic load of up to full capacity of the card sets and a minority of the transponder cards provisioned as floating spare cards for the active cards. In the configuration of FIG. 4, each node may include a single floating transponder card set 222. However, additional floating card sets (e.g., a minority less than the number of active card sets) may be used at particular nodes.

Process 500 may also include identifying a failure in the optical network (block 520). For example, network management system 120 may identify one of a transponder card failure, a fiber failure, or a node failure. In one implementation, network management modules 240 may indicate a local failure or transmission time-out for an individual card set or multiple card sets. In another implementation, network management system 120 may receive input from multiple network management modules 240 to determine a mode of failure. For example, network management system 120 may identify failed communications along multiple light paths to determine a fiber failure. Alternatively, network management system 120 may identify multiple card failures at a single optical node 110 to detect a node failure.

Process 500 may further include provisioning, when the failure is a transponder card failure, one of the floating spare cards in a node with the failed transponder card to service the particular light path associated with the failed transponder card, and routing the light path associated with the failed transponder card to the one of the floating spare cards (block 530). For example, referring to FIG. 6A, a single card (e.g., a transponder card 222 or a switch gray optics module 232) or an interface (e.g., a switch-transponder interface 234) within node 110-C1 may fail, causing an interruption in the light path between node 110-A1 and node 110-C1. Floating transponder card 222-S at node 110-C1 may be used to replace the failed card/interface. ROADM 210-C1 may direct a new light path 610 (e.g., using the same wavelength that was previously reserved for the failed card) from floating transponder card 222-S to the corresponding transponder card at node 110-A1. The transition from the failed card to floating transponder card 222-S in node 110-C1 may be performed without physical intervention from a technician.

Process 500 may additionally include routing, when the failure is a fiber failure, traffic around the fiber failure while maintaining the required bandwidth (block 540). For example, referring to FIG. 6B a fiber cut is detected between node 110-C1 and node 110-A1. The fiber cut interrupts all light paths traversing between node 110-C1 and node 110-A1. New light paths may be provisioned to avoid the fiber cut using the same wavelengths that were previously used for the failed paths. For example, new light path 615 through nodes 110-A1, 110-A2, 110-C2, 110-A4, 110-A3, and 110-C1 may replace the failed light path between nodes 110-A1 and 110-C1. Similarly, new light path 620 through nodes 110-A2, 110-C2, 110-A4, 110-A3, and 110-C1 may replace the failed light path through nodes 110-A2, 110-A1, and 110-C1. Additionally, new light paths 625 and 630 through nodes 110-C1, 110-A3, 110-A4, and 110-C2 may replace the failed light path through nodes 110-C1, 110-A1, 110-A2, and 110-C2. The re-routing of the new light paths may be performed without physical intervention from a technician.

Process 500 may also include provisioning, when the failure is a node failure, at least some of the transponder cards in some of the optical nodes to reconfigure at least some of the plurality of light paths to route traffic around the failed node (block 550). For example, referring to FIG. 6C, a failure of node 110-C1 may be detected. The node failure interrupts all light paths light paths traversing between node 110-C1 and node 110-A1 and traversing between nodes 110-C1 and 110-A3. New light paths may be provisioned to avoid the failed node. As shown in FIG. 6C, transponders in node 110-C2 that were previously used for core-to-core communications (e.g., between node 110-C1 and node 110-C2) may be re-provisioned for aggregation-to-core communications (e.g., between node 110-C2 and each of the aggregation nodes 110-A1, 110-A2, 110-A3, and 110-A4). In some cases, some transponder cards in the remaining nodes (e.g., nodes 110-A1, 110-A2, 110-A3, 110-A4, and 110-C2) may be re-provisioned with different wavelengths than were previously used for the failed paths.

For example, new light path 635 through nodes 110-A1, 110-A2, and 110-C2 may replace the failed light path between nodes 110-A1 and 110-C1 (e.g., using the wavelength originally provisioned for the light path between nodes 110-A1 and 110-C1). New light path 640 through nodes 110-A2 and 110-C2 may replace the failed light path through nodes 110-A2, 110-A1, and 110-C1 (e.g., using the wavelength originally provisioned for the light path between nodes 110-A2, 110-A1, and 110-C1). Additionally, new light path 645 through nodes 110-A3, 110-A4, and 110-C2 may replace the failed light path between nodes 110-A3 and 110-C1 (e.g., using the wavelength originally provisioned for the light path between nodes 110-A3 and 110-C1); and new light path 650 through nodes 110-A4 and 110-C2 may replace the failed light path through nodes 110-A4, 110-A3, and 110-C1 (e.g., using the wavelength originally provisioned for the light path between nodes 110-A4, 110-A3, and 110-C1).

Although FIG. 5 illustrates an exemplary process 500 to manage an optical network, according to other implementations, process 500 may include additional operations, fewer operations, and/or different operations than those illustrated in FIG. 5 and described.

The foregoing description of implementations provides illustration, but is not intended to be exhaustive or to limit the implementations to the precise form disclosed. Accordingly, modifications to the implementations described herein may be possible.

According to an exemplary embodiment described, a method may include configuring an optical network for a required bandwidth. The network may include multiple optical nodes and a plurality of light paths between the multiple optical nodes. The multiple optical nodes may include transponder cards with a majority of the transponder cards provisioned as active cards to receive a traffic load of up to full capacity of the card sets and with a minority of the transponder cards provisioned as floating spare cards for the active cards. A network management device may identify a failure in the optical network as one of a transponder card failure, a fiber failure, or a node failure. When the failure is a transponder card failure, the network management device may provision one of the floating spare cards in a node with the failed transponder card to service the particular light path associated with the failed transponder card, and route the light path associated with the failed transponder card to the one of the floating spare cards. When the failure is a fiber failure, the network management device may re-route traffic around the fiber failure while maintaining the required bandwidth. When the failure is a node failure, the network management device may provision at least some of the transponder cards in some of the optical nodes to reconfigure at least some of the plurality of light paths to route traffic around the failed node.

According to implementations described herein, the optical network may provide savings in gray optics and transponder cards while eliminating the need to reserve idle capacity for traffic protection purposes. The optical network may be configured to use full wavelength spectrum to meet bandwidth requirements for the network while requiring minimal spare cards.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks is described with regard to the processes illustrated in FIG. 5, the order of the blocks may be modified in other implementations. Further, non-dependent blocks may be performed in parallel. Additionally, with respect to other processes described in this description, the order of operations may be different according to other implementations, and/or operations may be performed in parallel.

An embodiment described herein may be implemented in many different forms of software and/or firmware executed by hardware. For example, a process or a function may be implemented as "logic" or as a "component." The logic or the component may include, for example, hardware, a combination of hardware and software, a combination of hardware and firmware, or a combination of hardware, software, and firmware. By way of example, hardware may include a processor. The processor may include, for example, one or multiple processors, microprocessors, data processors, co-processors, multi-core processors, application specific integrated circuits (ASICs), controllers, programmable logic devices, chipsets, field programmable gate arrays (FPGAs), system on chips (SoCs), programmable logic devices (PLSs), microcontrollers, application specific instruction-set processors (ASIPs), central processing units (CPUs) to interpret and/or execute instructions and/or data.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, operation, or instruction described in the present application should be construed as critical or essential to the embodiments described herein unless explicitly described as such.

What is claimed is:

1. A method comprising:
configuring an optical network for a required bandwidth, the optical network including:
multiple optical nodes and an optical fiber between each of the multiple optical nodes, each of the optical nodes being connected, in a ring topology, with another of the multiple optical nodes by one of the optical fibers,
wherein each of the multiple optical nodes includes a reconfigurable optical add/drop multiplexer (ROADM), a client-side switch, and multiple transponder cards between the ROADM and the client-side switch,
wherein the multiple optical nodes include multiple core nodes and multiple aggregation nodes and wherein the optical network includes a plurality of light paths between the multiple optical nodes, such that there are no direct light paths between aggregation nodes and such that each of the plurality of light paths is provisioned with particular wavelengths and the optical network does not include wavelengths reserved for protection of the required bandwidth, and
wherein the multiple transponder cards include a majority of the transponder cards provisioned as active cards to receive a traffic load of up to full capacity of the majority and a minority of the transponder cards provisioned as floating spare cards for the active cards;
identifying, by a network management device, a failure in the optical network as one of a transponder card failure, a fiber failure, or a node failure;
automatically provisioning, by the network management device and when the failure is a transponder card failure, one of the floating spare cards in one of the optical nodes with the failed transponder card to service a particular light path, of the plurality of light paths, associated with the failed transponder card, and routing the particular light path associated with the failed transponder card over the optical fibers to the one of the floating spare cards;
re-routing, by the network management device and when the failure is a fiber failure, traffic on first failed light paths, of the plurality of light paths, using the active cards and the particular wavelengths of the first failed light paths, around the fiber failure while maintaining the required bandwidth; and
automatically provisioning, by the network management device and when the failure is a core node failure, particular cards, of the active cards in a non-failing core node, that were previously used for light paths to a failed core node, wherein the particular cards are re-provisioned for light paths to other active cards in the aggregation nodes, and wherein the other active cards are re-provisioned with different wavelengths than were used for the light paths to the failed core node.

2. The method of claim 1, wherein the transponder card failure includes a failure to one of a transponder line optical module, a transponder gray optics module, a client-side switch gray optics module or a switch-transponder interface associated with a single light path.

3. The method of claim 1, wherein the optical fibers include nonzero dispersion-shifted fiber and wherein the optical network includes a long-haul optical network.

4. The method of claim 1, wherein provisioning at least some of the transponder cards in some of the optical nodes to reconfigure at least some of the plurality of light paths to route traffic around the failed node includes provisioning one or more of a transponder line optical module, a transponder gray optics module, a client-side switch gray optics module, or a switch-transponder interface associated with a single light path.

5. The method of claim 1, wherein each of the multiple transponder cards convert gray optical client interface signals into trunk signals that operate in colored wavelengths used by the ROADM and further convert signals in the colored wavelengths from the ROADM to gray optical client interface signals used by the client-side switch.

6. The method of claim 1, wherein the minority of the transponder cards provisioned as floating spare cards includes no more than two floating spare cards at each of the multiple optical nodes.

7. The method of claim 6, wherein the minority of the transponder cards provisioned as floating spare cards include exactly one floating spare cards at each of the multiple optical nodes.

8. The method of claim 1, wherein the optical network is a long-haul optical network.

9. The method of claim 1, wherein the ROADM in each of the multiple optical nodes includes colorless, directionless, and contentionless architecture.

10. The method of claim 9, wherein each of the transponder cards includes a 100 gigabytes per second (Gbps) multirate transponder card.

11. An optical network, comprising:
multiple optical nodes and an optical fiber between each of the multiple optical nodes, each of the optical nodes being connected, in a ring topology, with another of the multiple optical nodes by one of the optical fibers, wherein each of the multiple optical nodes includes a reconfigurable optical add/drop multiplexer (ROADM), a client-side switch, and multiple transponder cards between the ROADM and the client-side switch, and wherein the multiple optical nodes include multiple core nodes and multiple aggregation nodes;
a plurality of light paths between the multiple optical nodes, each of the plurality of light paths being configured with particular wavelengths and a required bandwidth, such that there are no direct light paths between aggregation nodes and such that the optical network does not include wavelengths reserved for protection of the required bandwidth, wherein the multiple transponder cards include a majority of the transponder cards provisioned as active cards to receive a traffic load of up to full capacity of the majority and a minority of the transponder cards provisioned as floating spare cards for the active cards; and
a network monitoring device including one or more processors configured to:
monitor the optical network,
identify a failure in the optical network,
re-route, when the failure is a fiber failure, traffic on first failed light paths, of the plurality of light paths, using the active cards and the particular wavelengths of the first failed light paths, around the fiber failure while maintaining the required bandwidth for the optical network, provision, when the failure is a transponder card failure within one of the multiple optical nodes, a floating spare card in the one of the multiple optical nodes to service a particular light path, of the plurality of light paths, associated with the transponder card failure, and route the particular light path over the optical fibers to the floating spare card, and provision, when the failure is a core node failure, particular cards, of the active cards in a non-failing core node, that were previously used for light paths to a failed core node, wherein the particular cards are re-provisioned for light paths to other active cards in the aggregation nodes, and wherein the other active cards are re-provisioned with different wavelengths than were used for the light paths to the failed core node.

12. The optical network of claim 11, wherein each of the multiple transponder cards convert gray optical client interface signals into trunk signals that operate in colored wavelengths used by the ROADM and further convert signals in the colored wavelengths from the ROADM to gray optical client interface signals used by the client-side switch.

13. The optical network of claim 12, wherein each of the transponder cards include a 100 gigabytes per second (Gbps) multirate transponder card.

14. The optical network of claim 11, wherein each of the multiple optical nodes includes exactly one floating spare card.

15. The optical network of claim 11, wherein the transponder card failure includes a failure to one of a transponder line optical module, a transponder gray optics module, a switch gray optics module or a switch-transponder interface associated with a single light path.

16. The optical network of claim 11, wherein at least two of the multiple optical nodes include a core node with eight active 100 gigabytes per second (Gbps) multirate transponder cards.

17. The optical network of claim 11, wherein at least one of the multiple optical nodes includes an aggregation node with two active 100 gigabytes per second (Gbps) multirate transponder cards and exactly one floating spare 100 Gbps multirate transponder card.

18. A network monitoring device for an optical network, comprising:
a memory to store a plurality of instructions; and
one or more processors configured to:
monitor the optical network, the network including:
multiple optical nodes and an optical fiber between each of the multiple optical nodes, each of the optical nodes being connected, in a ring topology, with another of the multiple optical nodes by one of the optical fibers, wherein each of the multiple optical nodes includes a reconfigurable optical add/drop multiplexer (ROADM), a client-side switch, and multiple transponder cards between the ROADM and the client-side switch, wherein the multiple optical nodes include multiple core nodes and multiple aggregation nodes, and
a plurality of light paths, the plurality of light paths traversing the optical fibers between the multiple optical nodes, wherein each of the plurality of light paths support a required bandwidth when the light paths are used at full capacity such that there are no direct light paths between aggregation nodes and such that the optical network does not include wavelengths reserved for protection of the required bandwidth, wherein the multiple transponder cards include a majority of the transponder cards provisioned as active cards to receive a traffic load of up to full capacity of the majority and a minority of the transponder cards provisioned as floating spare cards for the active cards,
identify a failure in the optical network as one of a fiber failure, a transponder card failure within one of multiple optical nodes, or a node failure,
when the failure is a fiber failure, re-route traffic on first failed light paths, of the plurality of light paths, using the active cards and wavelengths of the first failed light paths, around the fiber failure while maintaining the required bandwidth for the optical network,
when the failure is a transponder card failure, provision a floating spare card in the one of the multiple optical nodes to service a particular light path, of the plurality of light paths, associated with the transponder card failure, and route the particular light path over the optical fibers to the floating spare card, and
when the failure is a core node failure, provision particular cards, of the active cards in a non-failing core node, that were previously used for light paths to a failed core node, wherein the particular cards are re-provisioned for light paths to other active cards in the aggregation nodes, and wherein the other active cards are re-provisioned with different wavelengths than were used for the light paths to the failed core node.

19. The network monitoring device of claim 18, wherein, when provisioning floating spare card in the one of the multiple optical nodes, the one or more processors are further configured to use a same fiber and wavelength for the floating spare card that was previously used for the light path through a failed transponder card.

20. The method of claim 1, wherein automatically provisioning the one of the floating spare cards in the node with the failed transponder card further comprises:
using a same fiber and wavelength, of the particular wavelengths, for the one of the floating spare cards that was previously reserved for the light path through the failed transponder card.

* * * * *